United States Patent
Bose

(10) Patent No.: US 11,405,360 B1
(45) Date of Patent: Aug. 2, 2022

(54) ONE CLICK ACTIVE DIRECTORY INFRASTRUCTURE

(71) Applicant: Amazon Technologies, Inc., Seattle, WA (US)

(72) Inventor: Avik Bose, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 16/452,086

(22) Filed: Jun. 25, 2019

(51) Int. Cl.
*H04L 9/40* (2022.01)
*G06F 9/54* (2006.01)

(52) U.S. Cl.
CPC .......... *H04L 63/0272* (2013.01); *G06F 9/546* (2013.01); *G06F 2209/541* (2013.01)

(58) Field of Classification Search
CPC . H04L 63/0272; G06F 9/546; G06F 2209/541
See application file for complete search history.

(56) References Cited

U.S. PATENT DOCUMENTS

| | | | | |
|---|---|---|---|---|
| 2007/0186106 A1* | 8/2007 | Ting | | H04L 63/0815 713/168 |
| 2016/0094584 A1* | 3/2016 | Mehta | | G06F 21/604 726/1 |

OTHER PUBLICATIONS

Amazon Elastic Compute Cloud—User Guide for Windows Instances; 989 pages; archived Dec. 10, 2016; https://web.archive.org/web/20161210161950/http://docs.aws.amazon.com/AWSEC2/latest/WindowsGuide/ec2-wg.pdf (Year: 2016).*
AWS Tools for Windows PowerShell—User Guide; 68 pages; archived Jul. 30, 2018; https://web.archive.org/web/20180730074728/https://docs.aws.amazon.com/powershell/latest/userguide/aws-pst-ug.pdf (Year: 2018).*
Remove—IAMUser Cmdlet; 3 pages; archived Sep. 10, 2015 (Year: 2015).*

* cited by examiner

*Primary Examiner* — Doon Y Chow
*Assistant Examiner* — Kimberly L Jordan
(74) *Attorney, Agent, or Firm* — Eversheds Sutherland (US) LLP

(57) ABSTRACT

Systems, methods, and computer-readable media are disclosed for a one click active directory infrastructure. A process for managing an active directory infrastructure may include receiving a public application programming interface (API) call wherein the public API call is associated with an active directory of a private virtual network; determining, based on the public API call, a first account; determining that the first account is associated with a policy, wherein the policy indicates that the first account is permitted to access the active directory; and executing a function on the private virtual network, wherein the executing is associated with a second account of the active directory.

20 Claims, 7 Drawing Sheets

ONE CLICK ACTIVE DIRECTORY INFRASTRUCTURE

BACKGROUND

Cloud computing resources, services, and systems are increasingly being leveraged by individuals and organizations due to the ease, cost benefits, and flexibility in usage associated with the cloud. Many of the cloud's key benefits, such as rapid elasticity, on-demand provisioning, and high availability are very appealing to a wide range of customers. Policies may be used to manage large numbers of cloud computing customers, allowing for the creation of user accounts and groups of user accounts with the right to access the cloud computing resources, services, and systems. However, the creation of user accounts and account groups may be cumbersome and inefficient, requiring the performance of multiple manual steps. Therefore, the processes of managing user accounts and account groups for cloud computing resources, services, and systems may be improved.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

Figure 1:
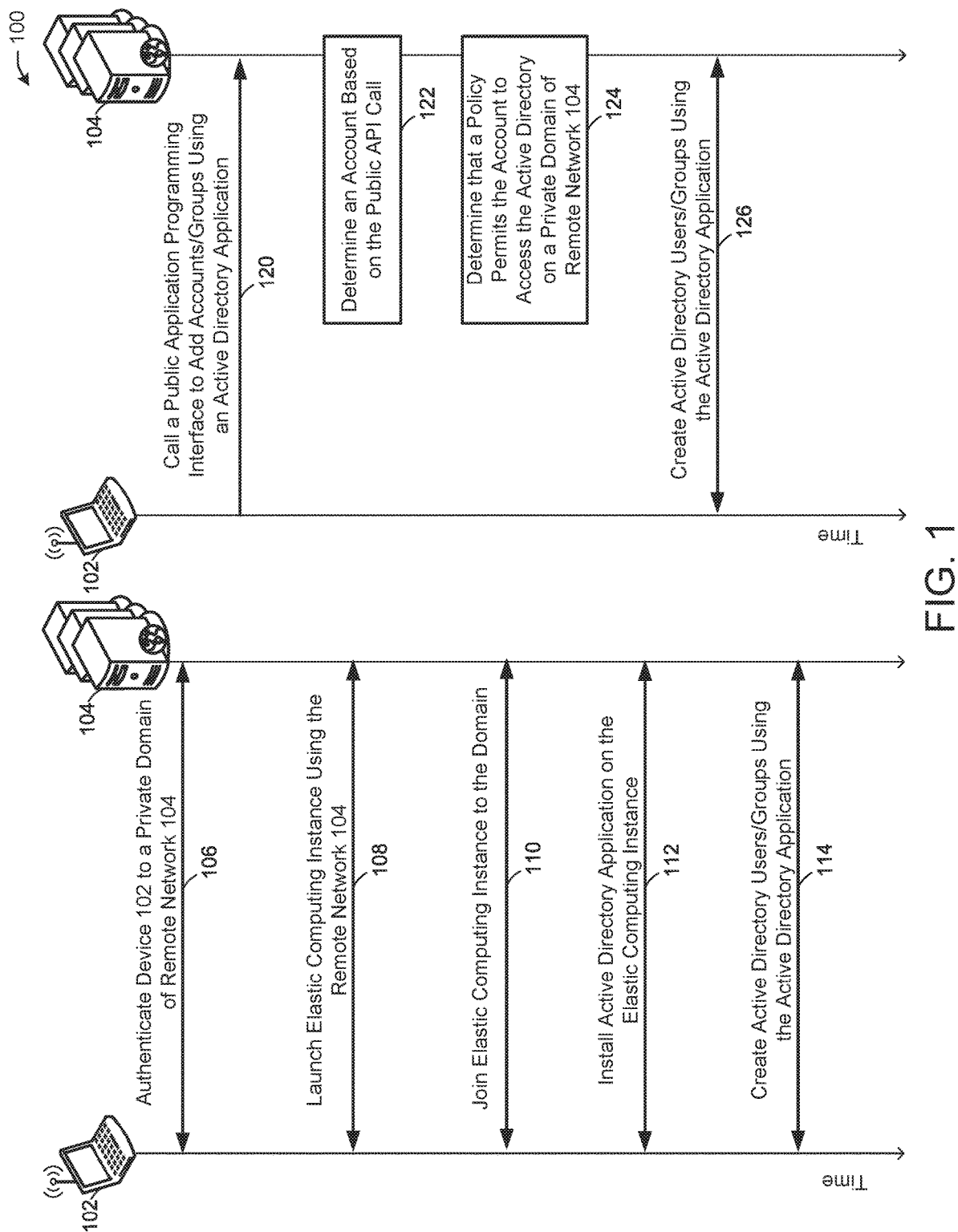
FIG. 1 is a process illustrating one click management of an active directory infrastructure, in accordance with one or more example embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for a one click active directory infrastructure.

Cloud computing resources, services, and systems may use domain controllers to manage active directory user accounts and groups of user accounts for private domains of a virtual network within a cloud computing system. For example, a cloud computing system (e.g., a remote computing system with remote computing resources) may provide virtual networks (e.g., shared computing resources allocated to a cloud computer environment) dedicated to a group of user accounts (e.g., for an organization). A domain controller may be deployed in a virtual network (e.g., in a respective availability zone of the virtual network) and may provide access to an active directory (e.g., a service). The virtual network may include one or more private domains dedicated to user accounts and groups of accounts managed by a respective domain controller.

The active directory may include services to manage users and devices in the virtual network. For example, the active directory may be used by computer applications to manage access to cloud computing resources using security groups (e.g., administrator groups, read-only user groups, etc.). The active directory may facilitate the use of group policies and single sign-on, and may join elastic computing and other remote computing instances to a private domain of a virtual network. For example, domain-joined (e.g., authenticated) instances may communicate with one another (e.g., devices and applications using the instances in a domain may communicate with one another).

An elastic network interface may be created for a customer's cloud computing account. An elastic network interface may be a logical networking component in a virtual network that represents a virtual network card, and may include attributes such as a private Internet protocol (IP) address, an elastic IP address, a public IP address, security groups, a medium access control (MAC) address, and other attributes. The elastic network interface may be attached to instances in a virtual network, and may allow a customer to communicate with a domain controller. A customer may create elastic computing or other instances in the same virtual network domain as the domain controller, and may join the elastic computing instances to the domain controller or active directory to allow the customer to create or modify users and groups.

A user may create active directory users and user groups via active directory authentication. As an example, a cloud computing customer may use an administrative account (e.g., created as part of the domain creation of a virtual network) to be authenticated to the domain. Once authenticated, the customer may create active directory users and groups. The process may include multiple manual steps, such as creating an elastic computing instance, joining the elastic computing instance to the domain, installing an active directory management tool on the elastic computing instance joined to the domain, and then creating active directory users and groups using the active directory management tool. Such a process requires making application programming interface (API) calls within a private virtual network domain (e.g., requiring a customer to be authenticated to the private virtual domain first).

Therefore, the management of active directory user accounts and groups may be improved by using an authentication process without the need to be authenticated by a private virtual network domain and the need to make multiple calls from within the private domain.

In one or more embodiments, a managed active directory may provide public APIs, which allow active directory customers (e.g., customers with access to a corresponding private domain) to manage active directory users and groups without the need to make multiple calls from within a private domain. In particular, the public APIs may access a private domain and execute functions in the domain. For example, the public APIs may facilitate the creation, describing, and deletion of active directory users and groups without requiring authorization of a user within the domain. Customers may call the public APIs using a command line interface, a software development kit, a command line shell and scripting language, from a directory service console, or from other interfaces. Therefore, by accessing the private domain, the public APIs may allow for active directory management within a private domain without requiring a requesting user to be authenticated to the private domain.

In one or more embodiments, the managed active directory may act as a layer between the active directory and an identity manager. The identity manager may allow access to cloud computing resources by managing cloud computing resource permissions for users and groups. For example, the identity manager may allow customers to set conditions regarding which user accounts and groups may access cloud computing resources and services, at which times of day, using certain IP addresses, using a secured sockets layer (SSL), using multi-factor authentication, and the like. The identity manager may maintain sign-in credentials to a remote network, although a user credential for a remote network may not have access to a particular private domain within the remote network. Therefore, the identity manager credentials may be used to determine whether a user of the remote network is permitted to access a private domain and perform actions within the domain. For example, an identity manager credential may correlate to an active directory user with permissions to execute functions in a private domain.

In one or more embodiments, the managed active directory APIs may use a built-in domain user (e.g., created as part of the active directory creation process and managed by a directory service of the active directory) to create users and groups on behalf of a customer. Customers may leverage identity manager policies to control which identity manager roles and/or accounts are permitted to invoke the managed active directory APIs.

In one or more embodiments, with the user of the managed active directory public APIs and serverless computing functions (e.g., software code that can be run by a device without provisioning or managing servers), the managed active directory public APIs may allow customers to build an active directory domain, domain-joined instances, users, and groups, all from a single serverless computing function call instead of the above-described process requiring multiple calls from within a domain. In doing so, the active directory domain build process may be automated, and one public API call may allow for creating and modifying (e.g., updating) active directory users and groups. A serverless computer may allow for functions to be executed only when an action (e.g., someone accessing a computer resource, uploading data to a cloud computing resource, etc.) is performed (e.g., rather than a server hosting the function and running all the time).

In one or more embodiments, a domain controller may have an agent that may execute a computer code or computer script (e.g., including a list of computer-executable commands) on the domain controller with defined permissions. For example, a serverless computer function, a command line function, or a software development kit function may be provided to a customer from the virtual network to facilitate access of the customer to the identity manager. The customer may use identity manager access credentials to access a domain controller endpoint (e.g., the agent's endpoint), and may perform operations (e.g., read/write operations) on the domain controller to create a user or group, create a computer object, or the like by relying on identity management credentials rather than separate credentials for multiple calls to different services. By exposing the agent to the customer, the agent may allow for the execution management of users and groups with the domain controller through a single function or script.

In one or more embodiments, a domain controller agent may have the privileges that the domain controller has (e.g., not specified to any particular user). A customer may create an identity manager rule or policy (or the rule or policy may be created automatically) for the customer's identity manager account (e.g., a user name and credentials) to grant read and write access to a limited number of accounts with the domain controller agent. Therefore, regardless of whether a customer's account with the managed active directory does not otherwise allow the customer to read and write to the managed active directory users and groups, by relying on the user's identity manager account for authentication, the user may be able to execute user and group functions on the domain controller using the agent in a more streamlined manner. In particular, when the user calls a service executing on the domain controller, the service may interact with the identity manager rule or policy to determine whether the user has permission to access an organizational unit (e.g., a group of accounts in an active directory). When an API call requests an addition or modification to an organizational unit, the identity manager rule or policy may determine whether the identity manager account used is permitted to make the API by identifying a policy that defines the account permissions. Permitted calls may be allowed to pass through to the specified destination of the call (e.g., on a virtual network domain). Calls which are not permitted may be blocked.

In one or more embodiments, a document or other API payload may be uploaded to the domain controller agent. The API payload may provide functions of scripts that perform tasks (e.g., with "one click") by exposing the functionality of the agent to a customer through a public API rather than the customer having to take multiple steps within the domain of a virtual network. The functions may be serverless computer functions provided by a remote computing network, or may be other computer functions/scripts created by a user outside of a remote computing network resource. The agent may take the script to the active directory and configure the active directory according to the functions or scripts on the payload. When the script has errors (e.g., allows unwanted access or editing), the blast radius of the errors may be limited to the specific domain of the virtual network. The function defined in a payload may be stored with a user's account (e.g., as a script file). The function may include computer code that causes the function to be joined to a virtual network, thereby allowing the function to have access to resources on the virtual network. In this manner, a customer may execute a command of the function on the virtual network domain (e.g., rather than the function executing outside of the virtual network domain and having to call a domain endpoint). Because a function may be joined to a virtual network domain or may reside outside of the virtual network domain (e.g., on a user device which may access the virtual network domain), a hybrid approach may allow for interaction between the function joined to the virtual network domain and the serverless computer function outside of the virtual network domain. The hybrid approach may allow a domain function to update a non-domain function, or the non-domain function to update the domain function (e.g., by uploading scripts to be executed on the domain).

In one or more embodiments, a user may build an active directory domain and elastic computing instances, may join the elastic computing instances to the active directory domain, and may use any of the elastic computing instances to log into the active directory domain and install management tools to create a directory service account. The directory service account may serve as a user account with which a user may execute computer applications. Other elastic computing instances may be used to install and execute other applications, which may be executed with a directory service account, thereby allowing user access to the domain. Users may perform load tests on elastic computing instances to determine whether an application is performing well, and may tear down accounts. Such normally requires multiple scripts and instances, but using a single function leveraging an identity manager account may simplify the process. In addition, a customer may call a specific endpoint that creates an active directory and may provide payload parameters that define the creation of a user account and associated password in the active directory. A customer may create elastic computing instances in the user account and may join the elastic computing instances to the domain. Customers may upload payloads to their active directory accounts that cause the installation of applications on elastic computing instances, the performance of load testing, and automated tear downs. For example, an application executing on a user device may reach a cloud computing endpoint that is not exposed to customers, and may leverage the domain controller agent to find user accounts in a cloud computing domain. Exposing the agent may allow users to have access to user accounts when an identity manager account is permitted by a rule or policy. Thus, with "one click" (e.g., a click to perform a function of an uploaded payload), the function may be performed without multiple instances and scripts in a domain.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 is a process illustrating one click management of an active directory infrastructure, in accordance with one or more example embodiments of the disclosure.

Referring to FIG. 1, a user device 102 may communicate with a remote computing network 104 (e.g., a cloud computing system), which may host remote computing resources and services. At step 106, the remote computing network 104 may authenticate the user device 102 to a private domain of the remote computing network 104. For example, the remote computing network 104 may provide multiple private domains dedicated to one or more users. The user device 102 may provide a user account and password or other authentication information, and the remote computing network 106 may verify that the user account and/or user device 102 may be joined to the domain (e.g., may communicate with other devices or instances launched in the domain). At step 108, the user device 102 may launch an elastic computing instance using the remote computing network 104. For example, the elastic computing instance may be an instance associated with a remote computing service provided by the remote computing network 104, the service allowing the user device 102 to provision a virtual computer with which to execute computer applications. At step 110, the user device 102 and the remote computing network 104 may join the elastic computing instance to the private domain of the remote computing network 104. Joining an instance to the private domain may include several steps, such as the user device 102 signing into a console managing access to the remote computing network 104, launching a console for an elastic computing service, launching the instance, and selecting the domain to join. At step 112, the user device 102 and the remote computing network 104 may install an active directory application on the instance for the elastic computing service. The installation may include multiple steps, such as selecting the instance from the elastic computing service, providing an input to connect to the instance, providing an input to download a file, providing login credentials, providing an input to add a role or feature, selectin an installation type, and selecting the active directory application for installation. At step 114, the user device 102 may create active directory users and groups using the active directory application (e.g., using a management tool of the active directory).

Still referring to FIG. 1, the user device 102 may call a public API to add accounts or groups using an active directory application of the remote computing network 104. For example, the remote computing network 104 may provide a set of public APIs for creating, describing, or deleting users/groups, respectively without requiring active directory authentication. At step 120, the user device 102 may make the public API call using a command line interface, a software development kit, a console for the active directory, or another service or interface. At step 122, the remote computing network 104 may determine an account based on the public API call. For example, the public API call may be signed with a user identifier that maps to an account. The account may be associated with the remote computing network 104, but not with the specific domain or active directory of the domain. In particular, the account may be used by a user of the user device 102 to sign into the remote computing network 104 to access remote computing services and resources provided by the remote computing network 104 outside of the private domain for the active directory. At step 124, the remote computing network 104 may determine that a policy permits the account to access the active directory of the private domain. For example, when an account for the active directory is created, a policy indicating what access permissions (e.g., read, write, etc.) the account used by a user of the user device 102 to sign into the remote computing network 104 may have with regard to the active directory of the private domain. In this manner, account credentials of an account that does not authenticate to the private domain may be used to determine that a user may access the private domain. At step 126, the user device 102 may create active directory users and groups using the active directory application (e.g., using a management tool of the active directory). The user device 102 may not need to be authenticated to the private domain of the remote computing network 104, and therefore may not need step 106, step 108, step 110, and step 112 inside of the domain to create active directory users and groups.

In one or more embodiments, the user device 102 may include any suitable processor-driven device including, but not limited to, a mobile device or a non-mobile, e.g., a static, device. For example, the user device 102 may include a digital set-top box, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

In one or more embodiments, the remote computing network 104 may include an active directory with services to manage users and devices in the virtual network. For example, the active directory may be used by computer applications to manage access to cloud computing resources using security groups (e.g., administrator groups, read-only user groups, etc.). The active directory may facilitate the use of group policies and single sign-on, and may join elastic computing and other remote computing instances to a domain of a virtual network (e.g., step 110).

In one or more embodiments, at step 106, a cloud computing customer using the user device 102 may use an administrative account (e.g., created as part of the domain creation of a virtual network) to be authenticated to the private domain. Once authenticated, the customer may create active directory users and groups. The process may include multiple manual steps, such as creating an elastic computing instance (e.g., step 108), joining the elastic computing instance to the domain (e.g., step 110), installing an active directory management tool on the elastic computing instance joined to the domain (e.g., step 112), and then creating active directory users and groups using the active directory management tool (e.g., step 114). Such a process requires making API calls within a private virtual network domain (e.g., requiring a customer to be authenticated to the private virtual domain first).

In one or more embodiments, a managed active directory may provide the public API used by step 120. The public APIs may facilitate the creation, describing, and deletion of active directory users and groups without requiring authorization of a user within the domain. Customers may call the public APIs using a command line interface, a software development kit, a command line shell and scripting language, from a directory service console, or from other interfaces.

In one or more embodiments, the managed active directory APIs may use a built-in domain user (e.g., created as part of the active directory creation process and managed by a directory service of the active directory) to create users and groups on behalf of a customer. Customers may leverage identity manager policies to control which identity manager roles and/or accounts are permitted to invoke the managed active directory APIs.

In one or more embodiments, with the user of the managed active directory public APIs and serverless computing functions (e.g., software code that can be run by a device without provisioning or managing servers), the managed active directory public APIs may allow customers to build an active directory domain, domain-joined instances, users, and groups, all from a single serverless computing function call (e.g., step 120) instead of steps (e.g., step 108, step 110, step 112) requiring multiple calls from within a domain. In doing so, the active directory domain build process may be automated, and one public API call may allow for creating and modifying active directory users and groups.

In one or more embodiments, a document or other payload may be uploaded to the domain controller agent (e.g., using the API call of step 120). The payload may provide functions of scripts that perform tasks (e.g., step 126) by exposing the functionality of the agent to a customer through a public API rather than the customer having to take multiple steps within the domain of a virtual network. The agent may take the script to the active directory and configure the active directory according to the functions or scripts on the payload. When the script has errors (e.g., allows unwanted access or editing), the blast radius of the errors may be limited to the specific domain of the virtual network. The function defined in a payload may be stored with a user's account (e.g., as a script file). The function may include computer code that causes the function to be joined to a virtual network, thereby allowing the function to have access to resources on the virtual network. In this manner, a customer may execute a command of the function on the virtual network domain (e.g., rather than the function executing outside of the virtual network domain and having to call a domain endpoint). Because a function may be joined to a virtual network domain or may reside outside of the virtual network domain (e.g., on a user device which may access the virtual network domain), a hybrid approach may allow for interaction between the function joined to the virtual network domain and the lambda outside of the virtual network domain. The hybrid approach may allow a domain function to update a non-domain function, or the non-domain function to update the domain function (e.g., by uploading scripts to be executed on the domain).

Figure 2:
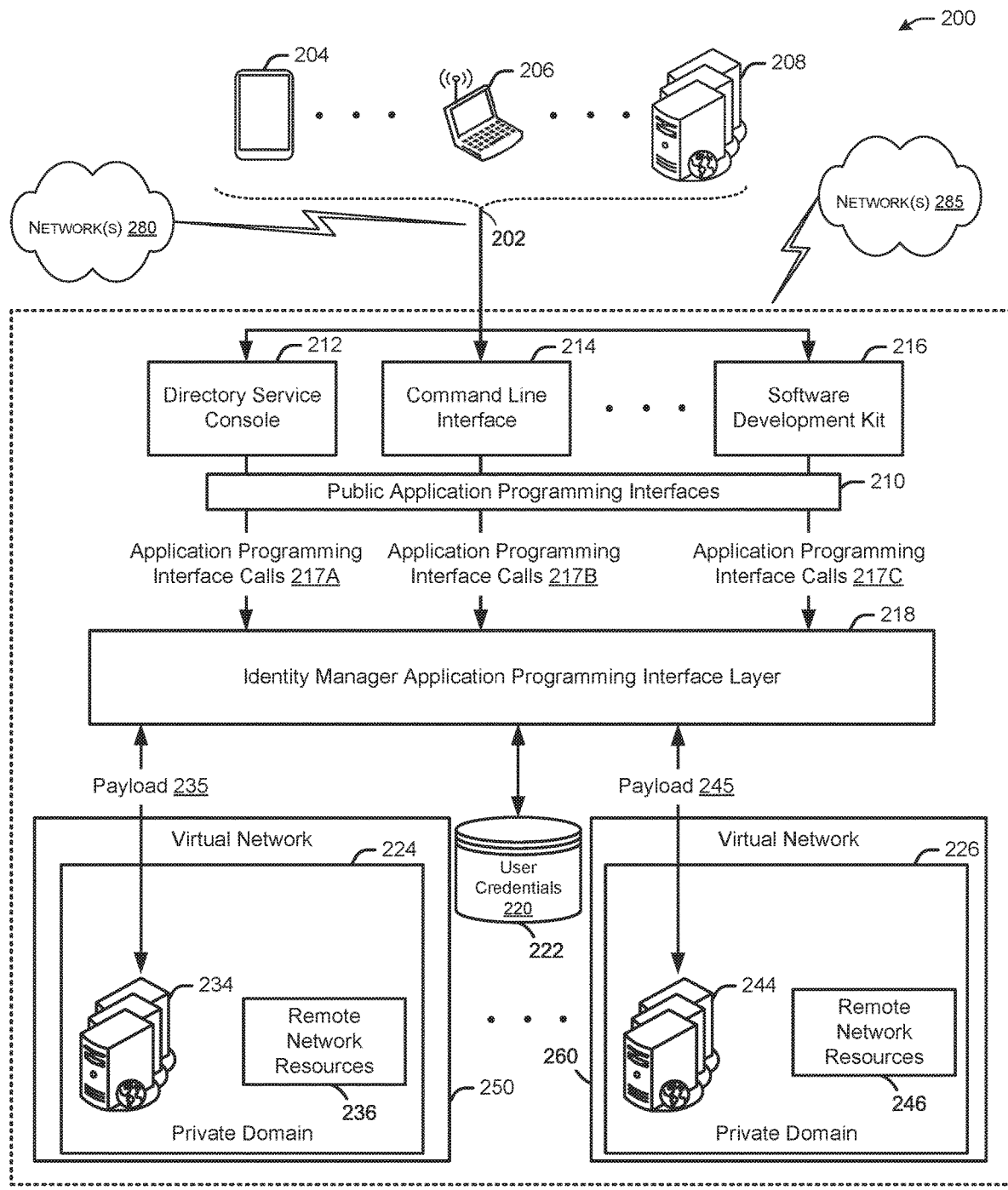
FIG. 2 is a system illustrating one click management of an active directory infrastructure, in accordance with one or more example embodiments of the disclosure.

FIG. 2 is a system 200 illustrating one click management of an active directory infrastructure, in accordance with one or more example embodiments of the disclosure.

Referring to FIG. 2, the system 200 may include one or more devices 202 (e.g., having similar functionality to the user device 102 of FIG. 1), such as user device 204, user device 206, and one or more servers 208. The one or more devices 202 may make public API calls using one or more public APIs 210. The one or more public APIs 210 may be provided by services or interfaces such as a directory service console 212, a command line interface 214, and a software development kit 216. The API calls may be specific to the type of API used to make the call (e.g., a read API, a write API, etc.). The API calls 217A, 218B, and 218C may be managed by an identity manager authenticated API layer 218 of a remote computing network 219 (e.g., having functionality similar to the remote computing network 104 of FIG. 1). The identity manager authenticated API layer 218 may receive the API calls 217A, 217B, and 217C, and may determine which respective user of the remote computing network 219 made the API calls (e.g., based on a signature of a respective API call, including a user identifier). The identity manager authenticated API layer 218 may map the user identifier to user credentials 220 stored in a database 222 or other storage type. The user credentials 220 may include accounts governed by policies and roles which allow users to access the remote computing network 219 and its resources (e.g., remote computing, data storage, etc.). The policies associated with an account may define to what extent, if any, an account may access a private domain (e.g., private domain 224, private domain 226) within the remote computing network 219.

Still referring to FIG. 2, the private domain 224 may include a domain controller 234, which may manage users and groups for the domain. Users and groups managed by the domain controller 234 may correspond to the user credentials 220. For example, when a user or group is created in the private domain 224, the access rights that govern the user or group may be stored in association with one or more accounts in the user credentials 220. In this manner, the user identifier in a public API call received by the identity manager authenticated API layer 218 may map to a user account permitted to access the private domain 224 as governed by the domain controller 234 without authenticating the device which made the public API call (e.g., the one or more user devices 202) to the private domain 224. Once the identity manager authenticated API layer 218 has determined that an account is permitted to access the private domain 224 (e.g., to manage users and groups of an active directory), the payload 235 of the public API call may be sent to the domain controller 234. The domain controller 234 may control access to remote network resources 236 (e.g., remote computing services, data storage, etc.) based on whether the corresponding user of the private domain 224 has permission to access the remote network resources 236. The remote computing network 219 may include additional private domains, such as the private domain 226. The identity manager authenticated API layer 218 may map a user identifier to the user credentials 220 and identify an account with access to the private domain 226, which may be managed by the domain controller 244, controlling access to the private domain 226 and its remote network resources 246. The identity manager authenticated API layer 218 may provide the payload 245 to the domain controller 244 for storage and/or execution within the private domain 226. The private domain 224 may be part of a private virtual network (e.g., virtual network 250), and the private domain 226 may be part of virtual network 260. The virtual network 250 and the virtual network 260 may be separate virtual networks dedicated to different accounts/organizations, or may be the same virtual network having multiple private domains.

Figure 3:
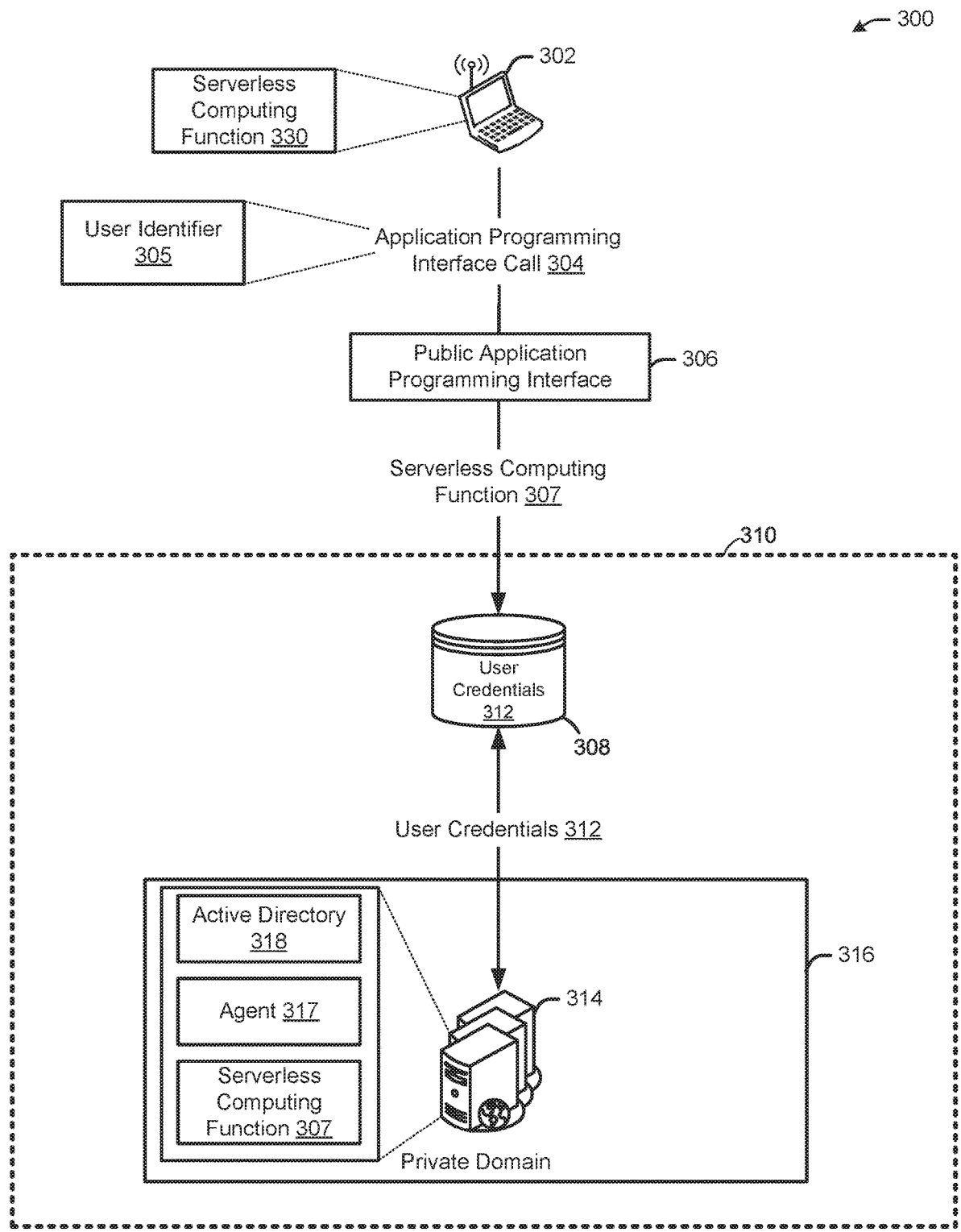
FIG. 3 is a system illustrating one click management of an active directory infrastructure, in accordance with one or more example embodiments of the disclosure.

In one or more embodiments, the remote computing network 219 may use the domain controller 234 and the domain controller 244 to manage user accounts and groups of user accounts for private domains (e.g., the private domain 224, the private domain 226) of a virtual network (e.g., the virtual network 250, the virtual network 260) within the remote computing network 219. For example, the remote computing network 219 may provide virtual networks (e.g., the virtual network 250, the virtual network 260) dedicated to a group of user accounts (e.g., for an organization). The domain controller 234 and the domain controller 244 may manage access to respective active directories (as shown in FIG. 3). For example, active directories may be directory services (e.g., which map network resources to network addresses, allowing for the execution of directory-aware workloads in the remote computing network 219). The domain controller 234 and the domain controller 244 may be servers running active directory domain services to authenticate and authorize users and devices (e.g., in the private domain 224 or the private domain 226). The active directory may include services to manage users and devices in the virtual networks. For example, the active directory may be used by computer applications to manage access to cloud computing resources using security groups (e.g., administrator groups, read-only user groups, etc.). The active directory may facilitate the use of group policies and single sign-on, and may join elastic computing and other remote computing instances to a domain of a virtual network.

An elastic network interface (not shown) may be created for a customer's cloud computing account. An elastic network interface may be a logical networking component in a virtual network that represents a virtual network card, and may include attributes such as a private Internet protocol (IP) address, an elastic IP address, a public IP address, security groups, a medium access control (MAC) address, and other attributes. The elastic network interface may be attached to instances in a virtual network, and may allow a customer to communicate with a domain controller (e.g., the domain controller 234 or the domain controller 244). A customer may create elastic computing or other instances in the same virtual network domain as the domain controller, and may join the elastic computing instances to the domain controller or active directory to allow the customer to create or modify users and groups.

In one or more embodiments, the public APIs 210 may allow active directory customers (e.g., customers with access to a corresponding private domain) to manage active directory users and groups without the need to make multiple calls from within a private domain. The public APIs 210 may facilitate the creation, describing, and deletion of active directory users and groups without requiring authorization of a user within the domain. Customers may call the public APIs 210 using the command line interface 214, the software development kit 216, the directory service console 212, or from other interfaces. The public APIs 210 may act as a layer between the active directory of a domain controller and an identity manager (e.g., the identity manager authenticated API layer 218).

In one or more embodiments, the public APIs 210 may use a built-in domain user (e.g., created as part of the active directory creation process and managed by a directory service of the active directory) to create users and groups on behalf of a customer (e.g., the user credentials 220). Customers may leverage identity manager policies to control which identity manager roles and/or accounts are permitted to invoke the public APIs 210.

In one or more embodiments, with the user of the managed active directory public APIs 210 and serverless computing functions, the public APIs 210 may allow customers to build an active directory domain, domain-joined instances, users, and groups, all from a single serverless computing function call (e.g., a public API call that includes the payload 235 or the payload 245). In doing so, the active directory domain build process may be automated, and one public API call may allow for creating and modifying active directory users and groups.

In one or more embodiments, the domain controller 234 and the domain controller 244 each may have an agent (as shown in FIG. 3) that may execute a computer code or script on the respective domain controller with defined permissions. The domain controller agent may have the privileges that the domain controller has (e.g., not specified to any particular user). A customer may create an identity manager rule or policy (or the rule or policy may be created automatically) for the customer's identity manager account (e.g., the user credentials 220) to grant read and write access to a limited number of accounts with a domain controller agent. Therefore, regardless of whether a customer's account with the managed active directory does not otherwise allow the customer to read and write to the managed active directory users and groups, by relying on the user's identity manager account (e.g., the user credentials 220) for authentication, the user may be able to execute user and group functions on a domain controller using the agent in a more streamlined manner.

In one or more embodiments, the payload 235 and the payload 245 may include a document and may be uploaded to the domain controller agent of a respective domain controller (e.g., the domain controller 234 or the domain controller 244). The payload 235 and the payload 245 may provide functions of scripts that perform tasks (e.g., with "one click") by exposing the functionality of the agent to a customer through the public APIs 210 rather than the customer having to take multiple steps within a respective private domain (e.g., the private domain 224, the private domain 226). The agent may take the script to the active directory and configure the active directory according to the functions or scripts on the payload. When the script has errors (e.g., allows unwanted access or editing), the blast radius of the errors may be limited to the specific domain of the virtual network. The function defined in a payload may be stored with a user's account (e.g., as a script file). The function may include computer code that causes the function to be joined to a virtual network (e.g., the virtual network 224, the virtual network 226), thereby allowing the function to have access to resources on the virtual network. In this manner, a customer may execute a command of the function on the virtual network domain (e.g., rather than the function executing outside of the virtual network domain and having to call a domain endpoint). Because a function may be joined to a virtual network domain or may reside outside of the virtual network domain (e.g., on the one or more user devices 202), a hybrid approach may allow for interaction between the function joined to the virtual network domain and the serverless computer function outside of the virtual network domain. The hybrid approach may allow a domain function to update a non-domain function, or the non-domain function to update the domain function (e.g., by uploading scripts to be executed on the domain).

Any of the communications networks 280 and/or 285 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 280 and/or 285 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 280 and/or 285 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

FIG. 3 is a system 300 illustrating one click management of an active directory infrastructure, in accordance with one or more example embodiments of the disclosure.

Referring to FIG. 3, the system 300 may include a user device 302 (e.g., having similar functionality to the user device 102 of FIG. 1). The user device 302 may make an API call 304 (e.g., the API calls 217A, 217B, 217C of FIG. 2) using a public API 306 (e.g., having similar functionality to the public APIs 210 of FIG. 2). The API call 304 may include a user identifier 305 to identify the user who made the API call 304, and may include a payload (e.g., the payload 235 or the payload 245 of FIG. 2). The payload may include a serverless computing function 307 that may be sent to a remote computing network 310 (e.g., having similar functionality to the remote computing network 219 of FIG. 2), or may identify the serverless computing function 307, which may be stored in the remote computing network 310 as explained further below.

Still referring to FIG. 3, the user identifier 305 may be mapped (e.g., using the identity manager authenticated API layer 218 of FIG. 2) to a database 308 or other storage storing user credentials 312. The user credentials 312 may include users and groups allowed to access resources and services provided by the remote computing network 310. However, some resources may of the remote computing network 310 may be accessed only when a user or group is permitted to access a private domain (e.g., private domain 316). The remote computing network 310 may use the user credentials 312 to verify that a user of a domain controller 314 (e.g., having functionality similar to the domain controller 234 and the domain controller 244 of FIG. 2) of a private domain 316 within the remote computing network 310 is permitted to access the private domain 316. The domain controller 314 may include an agent 317 that may execute a computer code or script (e.g., the serverless computing function 307) on the domain controller 314 with defined permissions. The domain controller 314 may include an active directory 318 for the private domain 316.

The active directory 318 may be a database or repository, and the domain controller 314 may control access to and manage the active directory 318. For example, the active directory 318 may be a directory service for the private domain 316, and the domain controller 314 may serve the directory service to the user device 302. The active directory 318 may be a service provided by software represented by the domain controller 314 (e.g., the active directory 318 may be a website, resource, service, or tool, and the domain controller 314 may act as a server to provide the web site, resource, service, or tool to the user device 302). The domain controller 314 may be one or multiple domain controllers, and may provide functionality such as load balancing and redundancy. The active directory 318 may store objects such as users, groups, and devices (e.g., similar to a database or other storage). The objects may include the configurations and permissions of users and devices in the private domain 316. The domain controller 314 may authenticate users and devices to the private domain 316 (e.g., step 120 of FIG. 1). With the active directory 318, remote services and resources (e.g., the remote network resources 236, the remote network resources 246 of FIG. 2) may be joined to the private domain 316, thereby allowing the remote services and resources to communicate with and otherwise access one another on the private domain 316.

In one or more embodiments, to avoid having to authenticate a user to the private domain 316, the remote computing network 310 may rely on the user credentials 312 to determine whether a corresponding user of the private domain 316 is permitted to access the private domain 316. For example, rather than requiring the authentication of the user device 302 to the private domain 316, the public API 306 may allow the remote computing network 310 to determine, in response to a single click of the user device 302 to make the API call 304, whether the user who made the API call is authorized to access the private domain 316 to deliver the serverless computing function 307 to the private domain 316 or to call the serverless computing function 307 for execution in the private domain 316. The public API 306 may be provided using an instance joined to the private domain 316.

In one or more embodiments, the serverless computing function 307 may be used to perform a variety of actions or tasks, such as load balancing, tear down, application or service installation, launching of instances, and the like. The agent 317 may execute the serverless computing function 307 in the private domain. Execution of the serverless computing function 307 may result in the performance of the actions or tasks as described above, and/or may result in the addition of users or groups to the active directory 318, deletion of users or groups from the active directory 318, or modification/description of users or groups of the active directory 318 (e.g., defining permissions regarding accessing and using certain services or resources).

In one or more embodiments, a serverless computing function 330 on the user device 302 may be used to make the API call 304 to access the serverless computing function 307 of the private domain 316. Such a hybrid model may allow interaction between the severless computing function 307 on the private domain 316 and the serverless computing function 330 outside of the private domain 316.

In one or more embodiments, the remote computing network 310 may use the domain controller 314—the active directory 318 specifically—to manage user accounts and groups of user accounts for private domains (e.g., the private domain 316) of a virtual network (e.g., the virtual network 250, the virtual network 260 of FIG. 2) within the remote computing network 310. The active directory 318 may manage user and directory information for the private domain 316, and the domain controller 314 may execute the functionality of the active directory 318. The domain controller 314 allows users and devices to join the private domain 316.

An elastic network interface (not shown) may be created for a customer's cloud computing account. An elastic network interface may be a logical networking component in a virtual network that represents a virtual network card, and may include attributes such as a private Internet protocol (IP) address, an elastic IP address, a public IP address, security groups, a medium access control (MAC) address, and other attributes. The elastic network interface may be attached to instances in a virtual network, and may allow a customer to communicate with a domain controller (e.g., the domain controller 314). A customer may create elastic computing or other instances in the same virtual network domain as the domain controller, and may join the elastic computing instances to the domain controller or active directory to allow the customer to create or modify users and groups.

In one or more embodiments, the public API 306 may allow active directory customers (e.g., customers with access to a corresponding private domain) to manage active directory users and groups without the need to make multiple calls from within a private domain. The public API 306 may facilitate the creation, describing, and deletion of active directory users and groups without requiring authorization of a user within the domain. Customers may call the public API 306 using an interface or program (e.g., the command line interface 214, the software development kit 216, the directory service console 212, of FIG. 2). The public API 306 may act as a layer between the active directory 318 and an identity manager (e.g., the identity manager authenticated API layer 218 of FIG. 2).

In one or more embodiments, the public API 306 may use a built-in domain user (e.g., created as part of the active directory creation process and managed by a directory service of the active directory 318) to create users and groups on behalf of a customer (e.g., the user credentials 312). Customers may leverage identity manager policies to control which identity manager roles and/or accounts are permitted to invoke the public API 306.

In one or more embodiments, with the user of the managed active directory public API 306 and the serverless computing function 307, the public API 306 may allow customers to build the active directory 318, domain-joined instances, users, and groups, all from a single serverless computing function call (e.g., the API call 304). In doing so, the active directory domain build process may be automated, and the public API call 304 may allow for creating and modifying active directory 318 users and groups, and/or the performance of other functions within the private domain 316.

Figure 4:
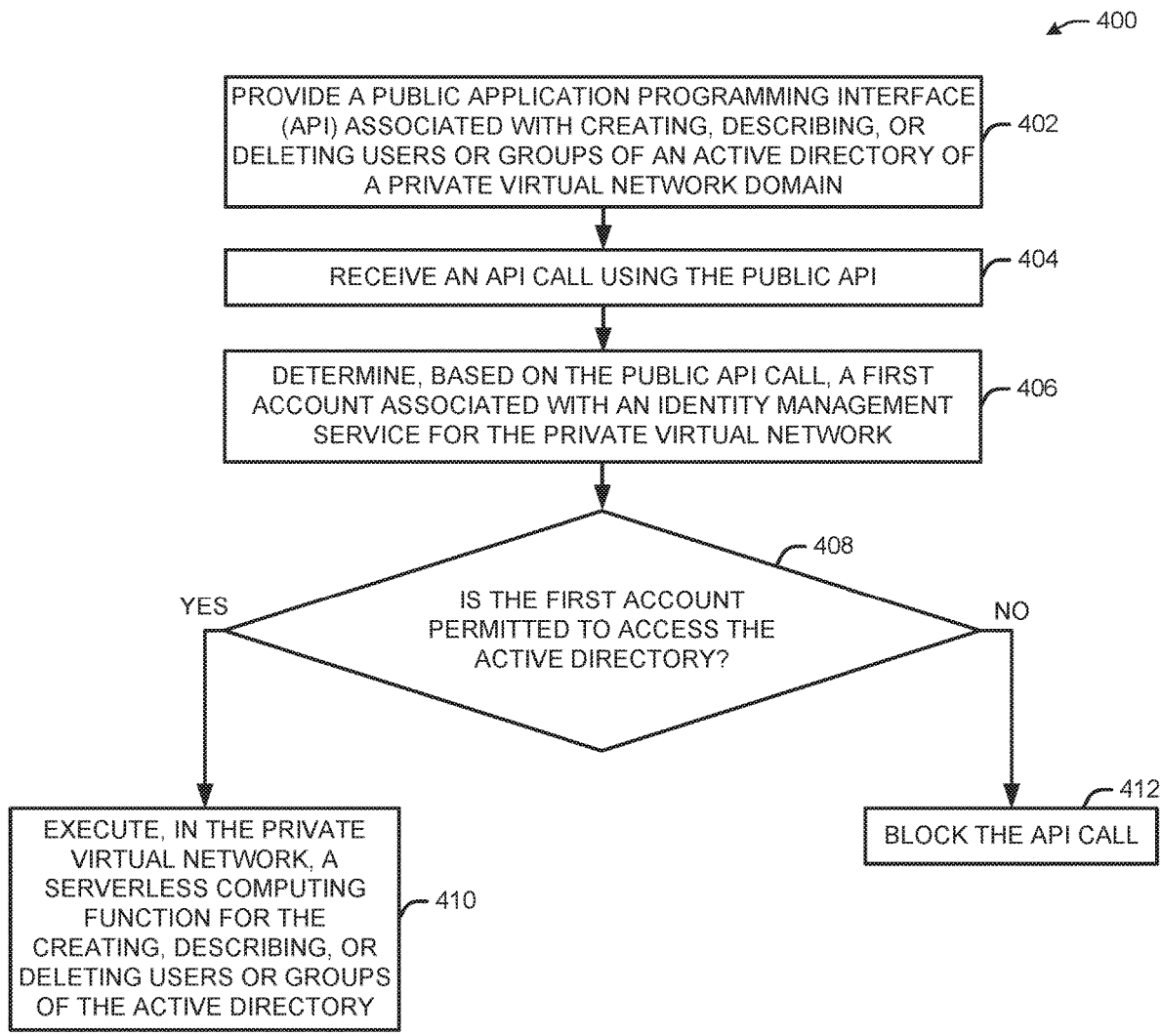
FIG. 4 is an example process flow, in accordance with one or more example embodiments of the disclosure.

FIG. 4 is an example process flow 400, in accordance with one or more example embodiments of the disclosure.

At block 402, a device or system (e.g., the public APIs 210 of FIG. 2, the public API 306 of FIG. 3) may provide a public API associated with creating, describing, or deleting users and/or groups of an active directory (e.g., the active directory 318 of FIG. 3) of a private virtual network domain (e.g., the private domain 224 of FIG. 2, the private domain 226 of FIG. 2, the private domain 316 of FIG. 3). The device or system may include a set of public APIs that may allow users of a remote network (e.g., the remote computing network 219 of FIG. 2, the remote computing network 310 of FIG. 3) to manage active directory user and group management, and/or other functions, in the private domain. For example, a user may make an API call with the device or system to execute or upload a function or script to the private domain, where the function or script may execute.

At block 404, the device or system may receive an API call (e.g., the API calls 217A, 217B, 217C of FIG. 2, the API call 304 of FIG. 3) using the public API. The API call may be made through an interface or service (e.g., the directory service console 212, the command line interface 214, the software development kit 216 of FIG. 2). The API call may include an indication of the user who made the call (e.g., the user identifier 305 of FIG. 3) and a payload (e.g., the payload 235, the payload 245 of FIG. 2). The payload may include an instruction, function, script, document, or the like. For example, the payload may include computer code for a serverless computing function (e.g., the serverless computing function 307 of FIG. 3) indicating whether to execute the function and/or upload the function to the domain for subsequent execution.

At block 406, the device or system may determine, based on the API call, a first account associated with an identity management service for the remote network. Using the indicator of the user who made the API call, the device or system may identify a user of the remote network. The credentials stored for the user (e.g., the user credentials 220 of FIG. 2, the user credentials 312 of FIG. 3) may be governed by policies or rules indicating the domains and services to which the first account has access. When a private domain and active directory are created, accounts and groups may be defined for the active directory to govern which accounts may be authenticated to the domain and allowed to access resources in the domain. The first account may not allow a user to access the domain even though the account may allow a user to access the remote network. Because the first account may be stored with governing credentials defining whether the first account corresponds to an account for the private domain, the device or system may determine whether the credentials for the first account permit the first account to access the private domain without the first account having to be authenticated in the private domain. For example, because the public APIs may access the private domain to execute the payload of the API calls, the credentials for the first account may define whether the first account is permitted to invoke the API used to make the API call.

At block 408, the device or system may determine whether the first account is permitted to access the active directory. When the credentials or policy for the first account indicate that the first account is permitted to use the API with which the API call was made, the device or system may determine that the first account is permitted to access the active directory of the private domain. In particular, the first account may correspond to an account of the active directory, and the policy may indicate that the first account may invoke the API to reach the private domain without the user having to authenticate to the domain. The permission may be general to the domain or active directory, or may be specific to the type of API call made. For example, when the API call is a read API call, the policy may indicate whether the first account has permission to read from the private domain. When the API call is a write API call, the policy may indicate whether the first account has permission to write to the private domain. When the first account is permitted to access the active directory (e.g., invoke the API to access the active directory), the device or system may proceed to block 410. When the first account is not permitted to access the active directory, the device or system may proceed to block 412, where the API call may be blocked (e.g., denied, discarded, etc.).

At block 410, the device or system may execute, in the private virtual network, a serverless computing function or another type of function or script in the private domain. For example, the function execution may result in the creation, description, or deletion of users or groups of the active directory. The function may cause load balancing, tear downs, testing, or other actions to be performed in the private domain. Execution of the function may result in accessing or interacting with instances of services or devices authenticated to (e.g., joined to) the private domain. The execution may be an execution of the payload of the API call, which may result in storing a script or file to the domain, or may specify a function to be executed. The device or system may identify the function to execute based on an indication in the API call (e.g., the API call may specify a function that is in the private domain to execute). The API call may be made from a function executing on a device (e.g., the serverless computing function 330 of FIG. 3), allowing the function to call another function within the domain.

Figure 5A:
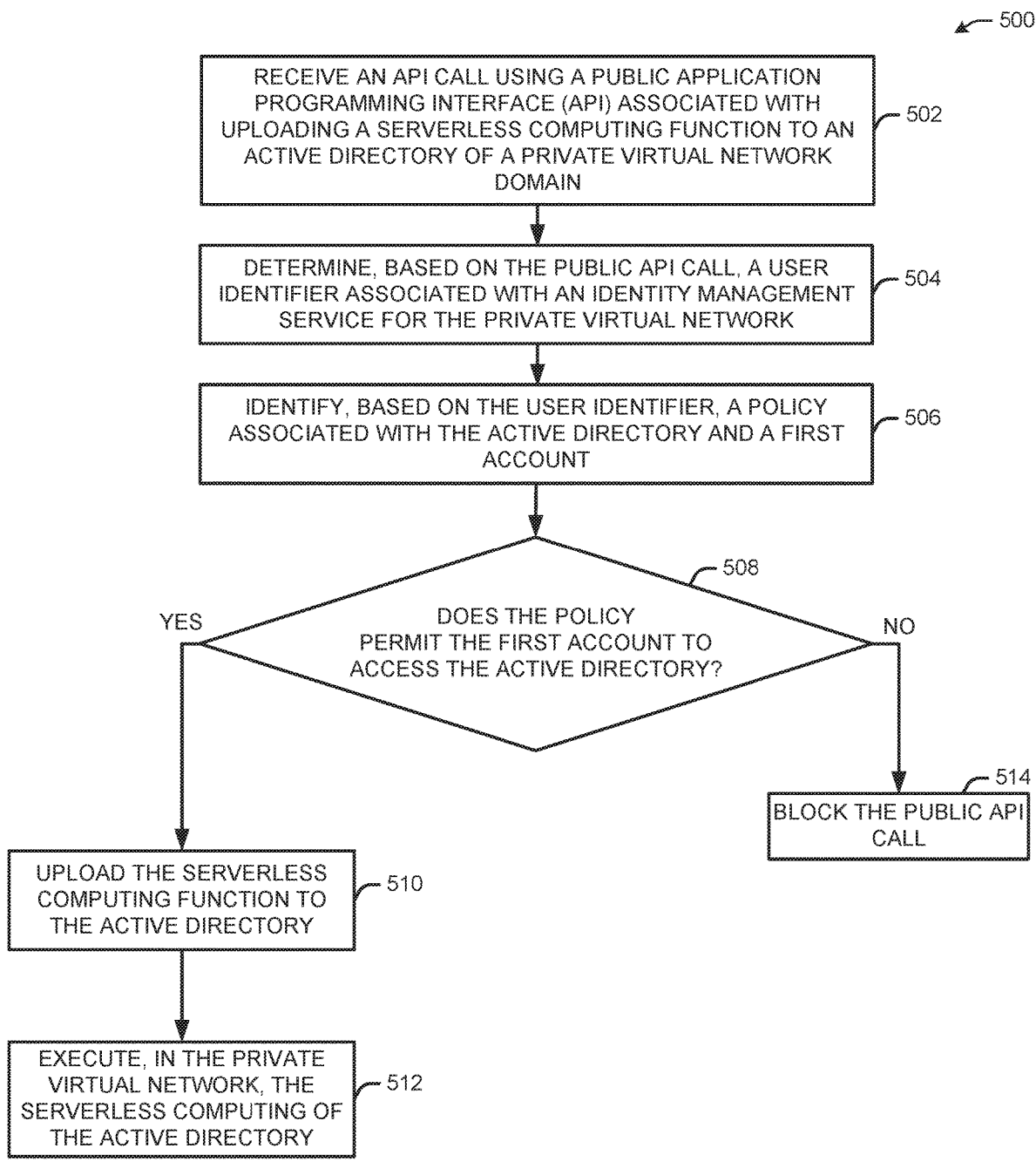
FIG. 5A is an example process flow, in accordance with one or more example embodiments of the disclosure.

FIG. 5A is an example process flow 500, in accordance with one or more example embodiments of the disclosure.

At block 502, a device or system (e.g., the public APIs 210 of FIG. 2, the public API 306 of FIG. 3) may receive an API call (e.g., the API calls 217A, 217B, 217C of FIG. 2, the API call 304 of FIG. 3) using a public API. The API call may be made through an interface or service (e.g., the directory service console 212, the command line interface 214, the software development kit 216 of FIG. 2). The API call may include an indication of the user who made the call (e.g., the user identifier 305 of FIG. 3) and a payload (e.g., the payload 235, the payload 245 of FIG. 2). The payload may include an instruction, function, script, document, or the like. For example, the payload may include computer code for a serverless computing function (e.g., the serverless computing function 307 of FIG. 3) indicating whether to execute the function and/or upload the function to a private virtual network domain (e.g., the private domain 224 of FIG. 2, the private domain 226 of FIG. 2, the private domain 316 of FIG. 3). The device or system may include a set of public APIs that may allow users of a remote network (e.g., the remote computing network 219 of FIG. 2, the remote computing network 310 of FIG. 3) to manage active directory user and group management, and/or other functions, in the private domain. For example, a user may make an API call with the device or system to execute or upload a function or script to the private domain, where the function or script may execute. The API may access the private domain to execute the API payload.

At block 504, the device or system may determine, based on the API call, a user identifier associated with an identity management service for the remote network. When a private domain and active directory are created, accounts and groups may be defined for the active directory to govern which accounts may be authenticated to the domain and allowed to access resources in the domain. A policy may be stored with a user account to indicate whether the user account may use the API with access to the private domain.

At block 506, the device or system may identify, based on the user identifier, the policy associated with a first account corresponding to the user identifier. Using the user identifier indicative of the user who made the API call, the device or system may identify a user of the remote network and a corresponding user account. The credentials stored for the user (e.g., the user credentials 220 of FIG. 2, the user credentials 312 of FIG. 3) may be governed by the policy indicating the domains and services to which the first account has access. The account may not allow a user to access the domain even though the account may allow a user to access the remote network. Because the account may be stored with governing credentials defining whether the account corresponds to an account for the private domain, the device or system may determine whether the credentials for the account permit the account to access the private domain without the first account having to be authenticated in the private domain. For example, because the public APIs may access the private domain to execute the payload of the API calls, the credentials for the first account may define whether the account is permitted to invoke the API used to make the API call.

At block 508, the device or system may determine whether the policy permits the account to access the active directory. When the credentials or policy for the account indicate that the account is permitted to use the API with which the API call was made, the device or system may determine that the account is permitted to access the active directory of the private domain. In particular, the account may correspond to an account of the active directory, and the policy may indicate that the account may invoke the API to reach the private domain without the user having to authenticate to the domain. The permission may be general to the domain or active directory, or may be specific to the type of API call made. For example, when the API call is a read API call, the policy may indicate whether the account has permission to read from the private domain. When the API call is a write API call, the policy may indicate whether the account has permission to write to the private domain. When the account is permitted to access the active directory (e.g., invoke the API to access the active directory), the device or system may proceed to block 510 and to block 512. When the first account is not permitted to access the active directory, the device or system may proceed to block 514, where the API call may be blocked (e.g., denied, discarded, etc.).

At block 510, the device or system may upload the serverless computing function provided as the API call payload to the active directory of the private domain. The API payload may provide a document, script, function, etc. which may be stored in the private domain so that a script or function may be executed in the private domain. At block 512, the device or system may execute the function in the private domain. For example, the API call may call for the execution, or a subsequent API call may indicate the uploaded function for execution. The execution may result in modifying the active directory, launching instances for any services joined to the domain, and may allow for a function which caused the API call to interact with a function on the domain.

Figure 5B:
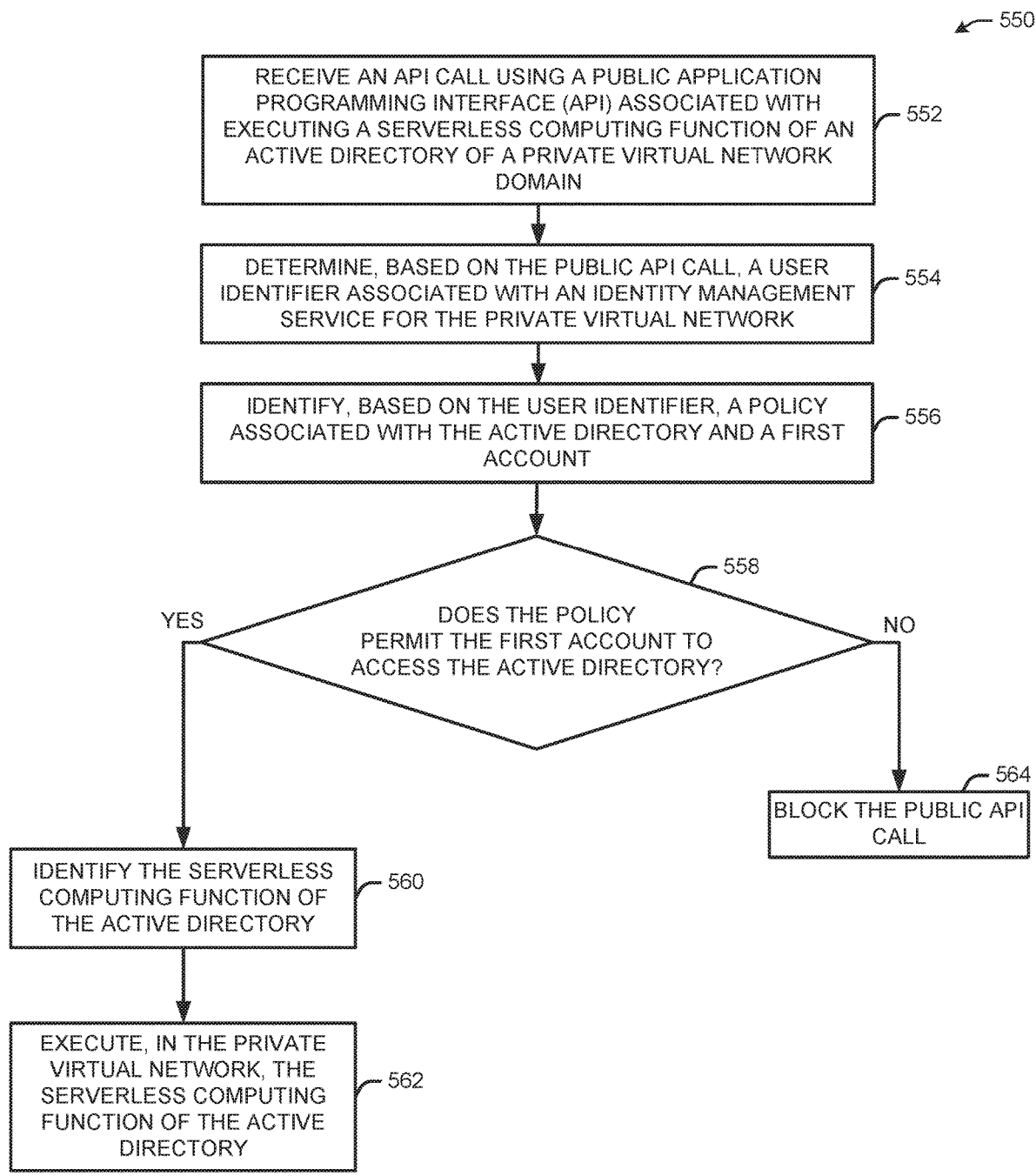
FIG. 5B is an example process flow, in accordance with one or more example embodiments of the disclosure.

FIG. 5B is an example process flow 550, in accordance with one or more example embodiments of the disclosure.

At block 552, a device or system (e.g., the public APIs 210 of FIG. 2, the public API 306 of FIG. 3) may receive an API call (e.g., the API calls 217A, 217B, 217C of FIG. 2, the API call 304 of FIG. 3) using a public API. The API call may be made through an interface or service (e.g., the directory service console 212, the command line interface 214, the software development kit 216 of FIG. 2). The API call may include an indication of the user who made the call (e.g., the user identifier 305 of FIG. 3) and a payload (e.g., the payload 235, the payload 245 of FIG. 2). The payload may include an instruction, function, script, document, or the like. For example, the payload may include computer code for a serverless computing function (e.g., the serverless computing function 307 of FIG. 3) indicating whether to execute the function and/or upload the function to a private virtual network domain (e.g., the private domain 224 of FIG. 2, the private domain 226 of FIG. 2, the private domain 316 of FIG. 3). The device or system may include a set of public APIs that may allow users of a remote network (e.g., the remote computing network 219 of FIG. 2, the remote computing network 310 of FIG. 3) to manage active directory user and group management, and/or other functions, in the private domain. For example, a user may make an API call with the device or system to execute or upload a function or script to the private domain, where the function or script may execute. The API may access the private domain to execute the API payload.

At block 554, the device or system may determine, based on the API call, a user identifier associated with an identity management service for the remote network. When a private domain and active directory are created, accounts and groups may be defined for the active directory to govern which accounts may be authenticated to the domain and allowed to access resources in the domain. A policy may be stored with a user account to indicate whether the user account may use the API with access to the private domain.

At block 556, the device or system may identify, based on the user identifier, the policy associated with a first account corresponding to the user identifier. Using the user identifier indicative of the user who made the API call, the device or system may identify a user of the remote network and a corresponding user account. The credentials stored for the user (e.g., the user credentials 220 of FIG. 2, the user credentials 312 of FIG. 3) may be governed by the policy indicating the domains and services to which the first account has access. The account may not allow a user to access the domain even though the account may allow a user to access the remote network. Because the account may be stored with governing credentials defining whether the account corresponds to an account for the private domain, the device or system may determine whether the credentials for the account permit the account to access the private domain without the first account having to be authenticated in the private domain. For example, because the public APIs may access the private domain to execute the payload of the API calls, the credentials for the first account may define whether the account is permitted to invoke the API used to make the API call.

At block 558, the device or system may determine whether the policy permits the account to access the active directory. When the credentials or policy for the account indicate that the account is permitted to use the API with which the API call was made, the device or system may determine that the account is permitted to access the active directory of the private domain. In particular, the account may correspond to an account of the active directory, and the policy may indicate that the account may invoke the API to reach the private domain without the user having to authenticate to the domain. The permission may be general to the domain or active directory, or may be specific to the type of API call made. For example, when the API call is a read API call, the policy may indicate whether the account has permission to read from the private domain. When the API call is a write API call, the policy may indicate whether the account has permission to write to the private domain. When the account is permitted to access the active directory (e.g., invoke the API to access the active directory), the device or system may proceed to block 560 and to block 562. When the first account is not permitted to access the active directory, the device or system may proceed to block 564, where the API call may be blocked (e.g., denied, discarded, etc.).

At block 560, the device or system may identify the function indicated by the payload of the API call. For example, the API call may indicate the function to identify and execute in the private domain. The API payload may provide a document, script, function, etc. which may call for the execution (e.g., with a command or indication of the function stored in the domain) of a function stored in the private for execution in the private domain. The device or system may retrieve the corresponding function or script from the domain. At block 562, the device or system may execute the function in the private domain. The execution may result in modifying the active directory, launching instances for any services joined to the domain, and may allow for a function which caused the API call to interact with a function on the domain.

One or more operations of the methods, process flows, or use cases of FIGS. 1-5B may have been described above as being performed by a user device, or more specifically, by one or more program module(s), applications, or the like executing on a device. It should be appreciated, however, that any of the operations of the methods, process flows, or use cases of FIGS. 1-5B may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5B may be described in the context of the illustrative devices, it should be appreciated that such operations may be implemented in connection with numerous other device configurations.

The operations described and depicted in the illustrative methods, process flows, and use cases of FIGS. 1-5B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5B may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
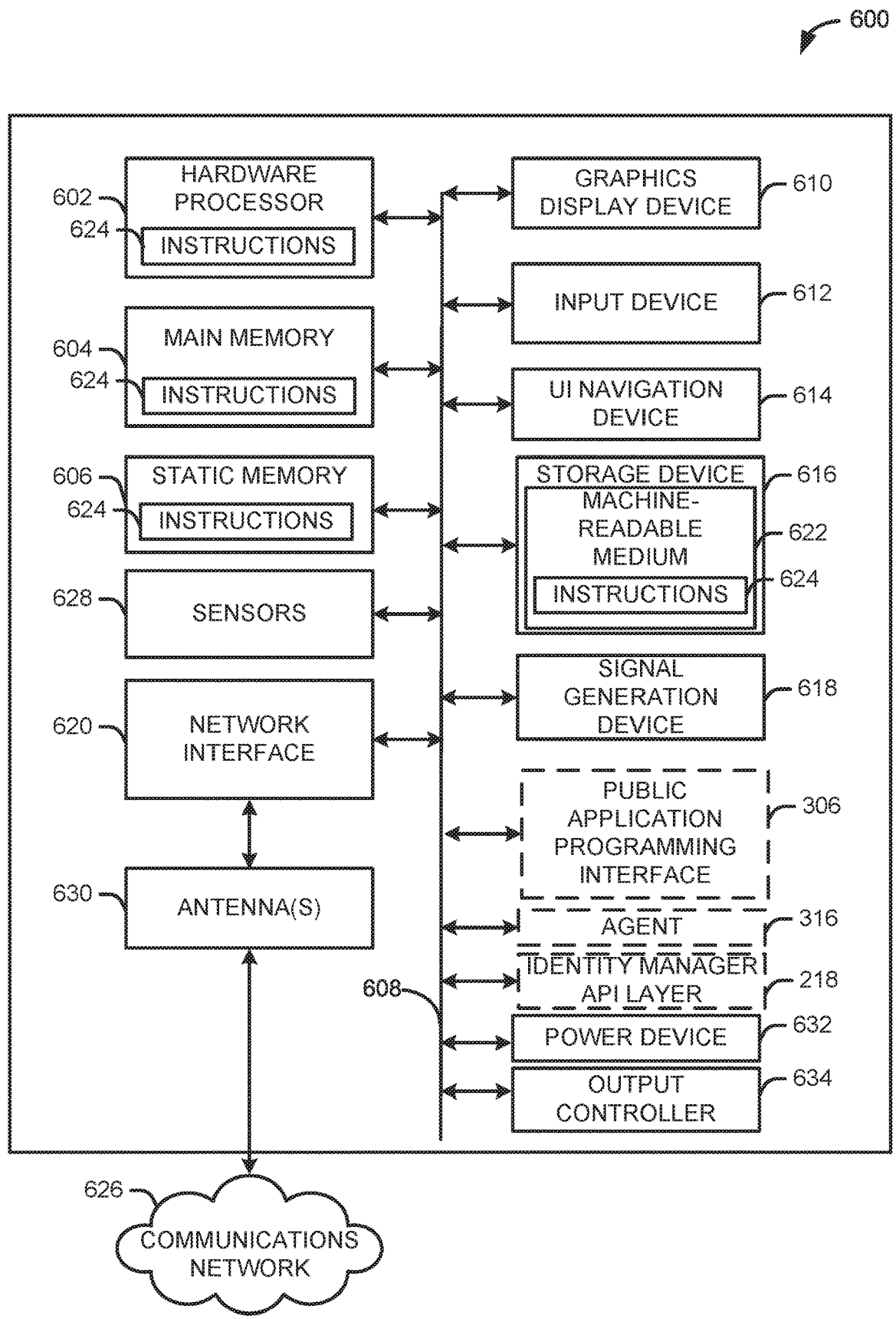
FIG. 6 is a block diagram of an example machine upon which any of one or more techniques (e.g., methods) may be performed in accordance with one or more example embodiments of the present disclosure.

FIG. 6 illustrates a block diagram of an example of a machine 600 (e.g., implemented in whole or in part by the user device 102 of FIG. 1, the remote computing network 104 of FIG. 1, the one or more user devices 202 of FIG. 2, the public APIs 210 of FIG. 2, the remote computing network 219 of FIG. 2, the identity manager API layer 218 of FIG. 2, the domain controller 234 of FIG. 2, the domain controller 244 of FIG. 2, the user device 302 of FIG. 3, the public API 306 of FIG. 3, the remote computing network 310 of FIG. 3, the domain controller 314) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a network interface device/transceiver 620 coupled to antenna(s) 630, one or more sensors 628, the public API 306 of FIG. 3, the agent 317 of FIG. 3, and/or the identity manager API layer 218 of FIG. 2. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
receiving a public application programming interface (API) call, wherein the public API call comprises a user identifier and information usable to determine a serverless computing function; and
in response to the public API call:
determining, based on the public API call, the user identifier and the serverless computing function, and wherein the serverless computing function is associated with an active directory of a private virtual network;
identifying, based on the user identifier, a policy associated with the active directory and a first account;
determining that the policy permits the first account to access the active directory;
uploading the serverless computing function to the active directory; and
executing the serverless computing function in a domain of the private virtual network, wherein executing the serverless computing function comprises updating the active directory.

2. The method of claim 1, wherein the serverless computing function is associated with creating a second account, wherein the first account is associated with an identity management service, and wherein updating the active directory comprises adding the second account to the active directory.

3. The method of claim 1, wherein the serverless computing function is associated with deleting a second account, wherein the first account is associated with an identity management service, and wherein updating the active directory comprises deleting the second account from the active directory.

4. The method of claim 1, further comprising providing the public API using an instance associated with the domain.

5. A method, comprising:
receiving a public application programming interface (API) call wherein the public API call comprises an indication of a serverless computing function associated with an active directory of a private virtual network; and
in response to receiving the public API call:
determining, based on the public API call, a first account;
determining that the first account is associated with a policy, wherein the policy indicates that the first account is permitted to access the active directory; and
executing, based on the policy, the serverless computing function on the private virtual network, wherein the executing is associated with a second account of the active directory.

6. The method of claim 5, wherein the public API call is associated with uploading the serverless computing function to the private virtual network.

7. The method of claim 5, further comprising identifying, based on the public API call, the serverless computing function in a payload of the public API call.

8. The method of claim 5, wherein the serverless computing function is associated with creating the second account, and wherein executing the serverless computing function comprises adding the second account to the active directory.

9. The method of claim 5, wherein the serverless computing function is associated with deleting the second account, and wherein executing the serverless computing function comprises deleting the second account from the active directory.

10. The method of claim 5, wherein executing the serverless computing function comprises launching elastic computing instances in a domain of the private virtual network, and wherein the domain is associated with the active directory.

11. The method of claim 5, wherein the public API call is received from a second serverless computing function.

12. The method of claim 5, wherein the executing comprises:
retrieving a document associated with the active directory; and
identifying the serverless computing function based on the document.

13. The method of claim 5, wherein the private virtual network is associated with a first domain and a second domain, wherein the execution is associated with the first domain, and wherein the execution excludes the second domain.

14. The method of claim 5, wherein the public API call is received using a command line interface, a software development kit, or a console associated with the active directory.

15. The method of claim 5, wherein a payload of the API call comprises a computer script associated with the active directory, and wherein executing the serverless computing function comprises executing the computer script.

16. The method of claim 5, wherein the executing comprises identifying, based on the first account, a third account permitted to execute the serverless computing function.

17. The method of claim 16, wherein the public API call is a read API call, and wherein the third account is permitted to read from the active directory.

18. The method of claim 16, wherein the public API call is a write API call, and wherein the third account is permitted to write to the active directory.

19. A device comprising memory and at least one processor, the at least one processor configured to:
receive a public application programming interface (API) call wherein the public API call comprises an indication of a serverless computing function associated with an active directory of a private virtual network; and
responsive to the public API call:
determine, based on the public API call, a first account;
determine that the first account is associated with a policy, wherein the policy indicates that the first account is permitted to access the active directory; and
execute, based on the policy, the serverless computing function on the private virtual network, wherein the executing is associated with a second account of the active directory.

20. The device of claim 19, wherein the public API call is associated with uploading the serverless computing function to the private virtual network.

* * * * *